T. AHEARN.
DRIVING MECHANISM FOR TALKING MACHINES.
APPLICATION FILED FEB. 25, 1919.

1,399,239.

Patented Dec. 6, 1921.

WITNESSES

INVENTOR
THOMAS AHEARN.
BY
ATT'YS.

UNITED STATES PATENT OFFICE.

THOMAS AHEARN, OF OTTAWA, ONTARIO, CANADA.

DRIVING MECHANISM FOR TALKING-MACHINES.

1,399,239.  Specification of Letters Patent.  Patented Dec. 6, 1921.

Application filed February 25, 1919. Serial No. 279,160.

*To all whom it may concern:*

Be it known that I, THOMAS AHEARN, a subject of the King of Great Britain, and resident of Ottawa, in the Province of Ontario, Dominion of Canada, have invented certain new and useful Improvements in Driving Mechanism for Talking-Machines, of which the following is a specification.

My invention relates to improvements in driving mechanism for talking machines, and forms a companion case with my Patent No. 134,358, granted May 18th, 1920, and the principal object of my invention is to produce a driving mechanism comprising a constant speed electric motor with means for retarding or accelerating the speed of the turn table. This object will be clearly and distinctly brought out in connection with the drawings and as the specification develops.

In the drawings.

Like characters of reference refer to like parts in the several figures.

Figure 1:
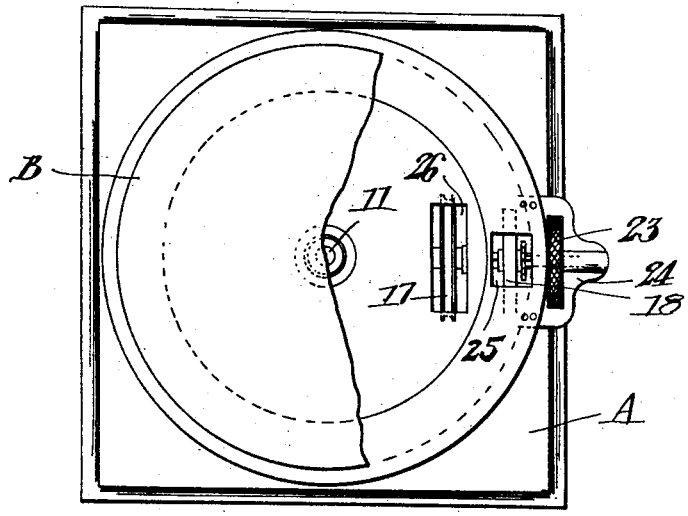
Figure 1 is a plan view of the upper portion of a talking machine embodying my invention.
Figure 2:
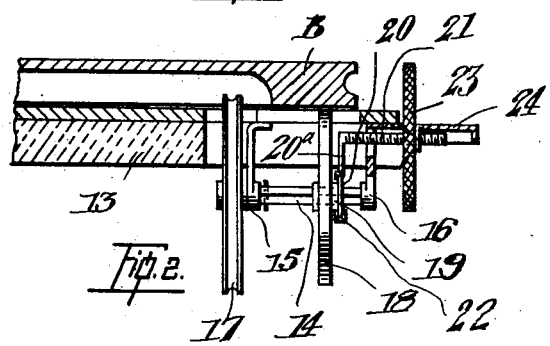
Fig. 2 is a fragmentary cross section of the same.
Figure 3:
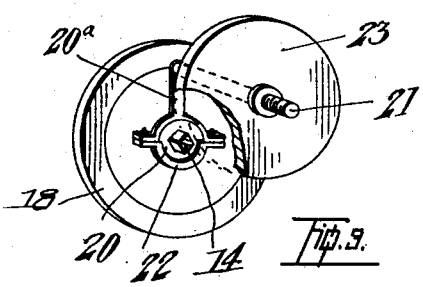
Fig. 3 is a perspective view of the means for retarding or accelerating the speed of the record turn table.

Referring to the drawings, the cabinet or casing of the talking machine may be of any size and design in which the various parts of the mechanism are inclosed, and is indicated at A.

B represents the record turn table which as illustrated is mounted on the upper end of a vertical spindle 11, the lower end of which is rotatably supported in a suitable bearing, the spindle being capable of rotation with the turn table.

The driving mechanism which is not illustrated but which has been fully described in my co-pending application comprises a constant speed electric motor suitably supported on the under side of the motor plate and provision is made for a suitable belt drive, the object of which will be made clear hereafter.

Brackets 15 and 16 are secured to the under side of the motor plate 13 and support the shaft 14 journaled in the said brackets, the part of the shaft intermediate of the brackets being square in cross section.

The shaft 14 carries a grooved pulley 17 which is engaged by the driving belt of the motor; and on the square portion of the shaft 14 there is mounted a friction driving wheel 18 rotatable with and slidable on the said shaft.

For the purpose of shifting the wheel 18 upon the shaft 14, the wheel is provided with a hub 19 having a flange 20 on its outer end adapted to be engaged by an arm 20$^a$ extending downwardly from the end of a threaded spindle 21. The arm 20$^a$ is provided with a yoke 22 embracing the flange 20 of the hub so as to leave it free to rotate therein but incapable of axial displacement relatively to the arm. For greater facility in assembling the clamping means upon the flange, it is, preferably, made in two portions. The threaded spindle is horizontally disposed with its axis parallel to the axis of the shaft 14 and is adapted to be actuated by an adjusting wheel 23 having a thread engagement therewith; the wheel 23 projecting above the upper face of the guard member 24 is held against lateral displacement or any movement other than its turning movement upon the spindle.

The motor plate 13 is provided with a pair of orifices 25 and 26 in the upper face thereof through the former of which the upper edge of the friction driving wheel 18 extends and through the orifice 26 the upper edge of the grooved driving wheel 17 extends.

The wheel 18, makes frictional engagement with the turn table B, and the position of the friction wheel 18 transmitting longitudinal motion to the threaded spindle 21 and in this way the wheel 18 is moved along the square portion of the shaft 14.

In operation, a record being placed on the turn table, and the motor started, should it be found that the record is revolved too fast, the adjusting wheel 23 is turned in clockwise direction, thereby causing the spindle 21 to travel axially through the wheel 23 away from the center of the turn table; and as a result of the engagement of the arm 20$^a$ with the driving wheel hub, the driving wheel will be moved in the same direction under the face of the turn table to any selected position.

Should the record be revolving too slowly the adjusting wheel will be turned in the reverse direction, to move the spindle and with it the driving wheel toward the center of the turn table.

As many changes could be made in the above construction, and many apparently widely different embodiments of my invention, within the scope of the claims, constructed without departing from the spirit or scope thereof, it is intended that all matter contained in the above specification and accompanying drawings, shall be interpreted as illustrative and not in a limiting sense.

What I claim as my invention is:

In a talking machine, a motor plate having an aperture therein, a record turn table pivoted thereon, a pair of brackets, a shaft rotatably mounted on the brackets, and provided intermediate of the brackets with a square portion, a friction driving wheel slidably mounted on the square portion of the shaft and rotatable therewith and designed to engage the under side of the turn table, a flange formed on the hub of the friction driving wheel, a spindle having an axis parallel to that of the shaft, a downwardly extending arm formed integral with the spindle, a yoke carried by the arm and engaging the flange, and a wheel projecting above the motor plate and having threaded engagement with the spindle, whereby the friction driving wheel is moved longitudinally on the shaft.

In witness whereof I have hereunto set my hand in the presence of a witness.

THOMAS AHEARN.

Witness:
 RUSSEL S. SMART.